United States Patent
Taylor et al.

(10) Patent No.: US 8,271,547 B2
(45) Date of Patent: Sep. 18, 2012

(54) STAGED PUBLICATION AND MANAGEMENT OF DYNAMIC WEBPAGES

(75) Inventors: Donald H. Taylor, Seattle, WA (US); Wade A. Matveyenko, Kirkland, WA (US); Rajan Krishnamurty, Bellevue, WA (US)

(73) Assignee: ADP Dealer Services, Inc., Seattle, WA (US)

( * ) Notice: Subject to any disclaimer, the term of this patent is extended or adjusted under 35 U.S.C. 154(b) by 383 days.

(21) Appl. No.: 11/442,821

(22) Filed: May 30, 2006

(65) Prior Publication Data
US 2006/0265355 A1 Nov. 23, 2006

(51) Int. Cl.
G06F 17/30 (2006.01)

(52) U.S. Cl. ........ 707/806; 707/791; 707/792; 707/793; 707/797; 707/798; 707/799; 707/800; 707/801; 707/803; 707/804; 707/805; 707/807; 707/808; 707/809; 707/812; 709/203; 709/230; 717/123

(58) Field of Classification Search .................. 717/123; 707/102, 101, 104.1, 204, 791, 792, 793, 707/797, 798, 799, 800, 801, 803, 804, 805, 707/806, 807, 808, 809, 812, 999.1; 709/203, 709/230

See application file for complete search history.

(56) References Cited

U.S. PATENT DOCUMENTS

| | | | |
|---|---|---|---|
| 6,178,432 B1 * | 1/2001 | Cook et al. | 715/201 |
| 6,594,664 B1 * | 7/2003 | Estrada et al. | 707/10 |
| 6,606,525 B1 * | 8/2003 | Muthuswamy et al. | 700/52 |
| 7,152,207 B1 * | 12/2006 | Underwood et al. | 715/207 |
| 7,155,491 B1 * | 12/2006 | Schultz et al. | 709/217 |
| 7,587,504 B2 | 9/2009 | Adams et al. | |
| 2002/0073080 A1 * | 6/2002 | Lipkin | 707/3 |
| 2002/0091755 A1 * | 7/2002 | Narin | 709/203 |
| 2003/0145310 A1 * | 7/2003 | Thames et al. | 717/123 |
| 2004/0041818 A1 * | 3/2004 | White et al. | 345/619 |
| 2004/0139203 A1 | 7/2004 | Graham, Jr. et al. | |
| 2007/0271154 A1 | 11/2007 | Broudy et al. | |
| 2009/0204454 A1 | 8/2009 | Lagudi | |

OTHER PUBLICATIONS

Final Office Action mailed Jul. 6, 2011, in U.S. Appl. No. 11/350,795, filed Jan. 24, 2003, 26 pgs.
Understanding X.500—The Directory. Chadwick, D.W. Available at http://sec.cs.kent.ac.uk/x500book/. 1996. Entire work cited.
Internet Archive Wayback Machine, archive of LDAP Browser. com—FAQ. Archived Dec. 11, 2000. Available at http://web.archive.org/web/20001211 0152/http://www.ldabrowser.com/faq/faq.php3?sID=fe4ae66f2f023d86909f35e974f3a1ce.
Internet Archive Wayback Machine, archive of LDAP Browser. com—Product Info. Archived Dec. 11, 2000. Available at http://web.archive.org/web/200012110541/http:www.ldapbrowser.com/prodinfo/prodinfo.php3?sID=fe4ae66f2f023d86909f35e974f3a1ce.
Office Action mailed Oct. 24, 2011, in U.S. Appl. No. 12/243,852, filed Oct. 1, 2088, 13 pgs.

* cited by examiner

*Primary Examiner* — Syling Yen
(74) *Attorney, Agent, or Firm* — John R. Thompson; Stoel Rives LLP

(57) ABSTRACT

A method for proofing a prototype dynamic webpage version referencing first configuration data is disclosed. The prototype dynamic webpage can be derived from a live version referencing second configuration data and accessible via a live link. The method includes storing first configuration data in a configuration database also containing second configuration data, providing a prototype link to the prototype dynamic webpage version dissimilar from the live link; and returning, upon a prototype link request, the prototype dynamic webpage version, involving rendering the prototype dynamic webpage version based on the first configuration data without altering the live dynamic webpage version. Also disclosed is a dynamic webpage versioning system working off a configuration database and distinct versions of configuration data.

18 Claims, 7 Drawing Sheets

DYNAMIC PAGE RETRIEVAL

{
WS: HTTP://... request for dynamic page received;
WS: access control, requestor verification based on HTTP://... request;
WS: if access control OK, then forward HTTP://... on to WLAS, else deny access;
AS: parse HTTP://... request parameters:
{
case PROOF /*build PROOF page */
case LIVE /*build LIVE page */
    {
        include static html components from PROTO || LIVE || PREVIOUS_LIVE subdirectory for page; /* no rendering !
        render dynamic components from JSP template using configuration data PROTO || LIVE and run-time data;
        return rendered page;
    }
case PREVIOUS_LIVE /*build previous live page*/
    {
    if keep_static /* if static html files are retained */
        then
        {
        include static html components from PREVIOUS_LIVE subdirectory for page; /* no rendering !
        render dynamic components from JSP template using PREVIOUS_LIVE configuration data and run-time data;
        }
        else render static and dynamic components from JSP template (and static component JSP files as appropriate in PREVIOUS_LIVE subdirectory) using PREVIOUS_LIVE configuration data and run-time data;
        return rendered page;
    }
case WIP /*build work in progress page*/
    {
        render static and dynamic components from JSP template (and static component JSP files as appropriate in appropriate subdirectory) using appropriate configuration data and run-time data;
        return rendered page
    }
}}

WS = Web Server
AS = Application Server

FIG. 6

TRANSITION WIP → PROTO (aka ACTIVATION), PE in possession of PROOF REQUEST
{
   PE: determine static components in WIP page; /*looking at dynamic page template*/
   PE: using WIP configuration data for page, render identified static components to form static html file(s);
   PE: store WIP configuration data as PROTO configuration data for page;
   PE: store static html file(s) in .../PROTO subdirectory of hierarchical file system;
   PE: update links to .../PROTO subdirectory and PROTO configuration data;
   PE: apprise user of URL for proof page via WS;
}

PE = Publication Engine
WS = Web Server

FIG. 7

TRANSITION PROOF → LIVE (aka VERIFICATION), PE in possession of LIVE
REQUEST
    {
    /* start by saving off current LIVE version */
    if keep_static
        then PE: store static html files in .../LIVE subdirectory as .../PREVIOUS_LIVE subdirectory;
    store LIVE configuration data for page as PREVIOUS_LIVE configuration data;
    /* next, put PROOF information into LIVE */
    PE: store static html files in .../PROOF to .../LIVE subdirectory;
    PE: store PROOF configuration data for page as LIVE configuration data in configuration database;
    PE: update links to .../LIVE subdirectory and /LIVE configuration data;
    }

PE = Publication Engine

FIG. 8

STAGED PUBLICATION AND MANAGEMENT OF DYNAMIC WEBPAGES

RELATED APPLICATIONS

This application claims priority to U.S. patent application Ser. No. 10/351,606 filed on Jan. 24, 2003 now U.S. Pat. No. 7,062,506 and entitled "Stage Publication and Management of Dynamic Webpages," which is hereby incorporated by reference.

TECHNICAL FIELD

This invention is generally directed to aspects of website management, and is particularly concerned with techniques for staged publication and versioning control over dynamic webpages.

BACKGROUND OF THE INVENTION

The "Web" is now well developed and literally millions of Web sites have been deployed, hosted on various servers around the world. Web sites comprises one or more related "pages," in some cases extending to scores or even hundreds of pages. The subject matter of web sites spans the full breadth human interests and endeavors, and many web pages now include dynamic content as well as multi-media content such as audio and video clips, slideshows and the like.

More recently, the use of "dynamic" webpages has become commonplace in website design, in part to ease design and publication burdens faced when attempting to build and manage large and feature-rich websites. Dynamic webpages are a type of webpage that produces potentially differing web content and/or interfacing on-the-fly based on one or more variable parameters passed to the webpage by a client browser or otherwise. Examples of dynamic webpages include java server pages or JSPs developed in accordance with the Java Server Pages Specification Version 1.2 (November 2001) and above available from Sun Microsystems of Mountain View, Calif. Another type of dynamic webpage includes active server pages or ASP developed in accordance with the Internet Information Services v 3.0 and above Software Development Kit available from the Microsoft Corporation of Redmond, Wash. Other dynamic webpages could include, by means of example only, Perl pages, PHP pages from the PHP Group, ColdFusion pages from Macromedia, Inc. of San Francisco, Calif., and servlets defined in Sun's Java Servlet Specification 2.1 and above.

Dynamic webpages are so powerful because of the active logic, conditional rules and/or heuristic instructions physically or virtually forming at least a part of each (collectively "code"). In the Java Server Pages example, such code is called a tag. This code is dependent on a variety of parameters passed to it, such as configuration data which is used to assist in defining the interface, fields, and typically, "static" information when the dynamic webpage is requested, rendered, and displayed to an end-user through a web browser or other paging review mechanism. In the automotive website context, a good example of configuration data would include parameters needed to assist or direct the code in rendering a specific auto dealer graphic, as well as parameters needed to cause the executing web server to issue and collect information related to a certain used car search parameter, and the like. This code also causes the web server executing the dynamic webpage to interact with other applications and objects, such as pulling dynamic or runtime data from e.g. a separately maintained database. Again in the automotive context, such runtime data can include used car inventory database results based on query captured by a server executing the dynamic page on behalf of a potential automotive customer in communication with the server via a client-oriented browser.

The web designer community is looking to dynamic webpages as a way to contain the problem of ever growing and increasingly complex websites, while providing richer features and more detailed and varied content. Without dynamic webpages, web designers would have to craft, track and maintain each distinct webpage individually, and interaction with a browser supporting an end-user would be limited at best. Manually managing such an architecture would quickly prove hopelessly complex. A dynamic webpage, on the other hand, through an appropriate code structure, can define numerous distinct rendered pages to the browser depending on e.g. input provided by the end-user which is passed to the dynamic webpage in the form of configuration and/or runtime data. In fact, a small number of thoughtfully constructed dynamic webpages can actually define a complete website, if not multiple websites. As such, a dynamic webpage can therefore be thought of as a template for producing individually rendered webpages known as target webpages, which, from the end-user browser perspective, may appear and function quite distinctly but are in fact the product of the interaction between a common dynamic webpage template with a particular set of configuration and/or runtime data.

However, a new problem emerges when dynamic webpage templating is extensively leveraged. As fewer and fewer dynamic webpage templates are employed to define more and more target webpage alternatives, the resulting template code structure necessarily becomes more and more complex to account for planned site variation, and accordingly more and more parameters must be passed and interpreted in connection with the template code before a desired target webpage can be rendered. The sophistication required in updating, modifying or altering the dynamic template or configuration data to produce a desired target webpage quickly approaches the complexity seen in conventional programming tasks, and a need for structured development of such templates, or at least configuration data becomes apparent. For example, it would be advantageous to provide a technique for proofing or executing, on a nondestructive trial basis, a prototype dynamic webpage, containing modified code or configuration data, that operates in the same fashion if it were actually made publicly available. Moreover, it would be advantageous to provide a dynamic webpage versioning system capable of tracking at least one previous version of a published dynamic webpage to enhance recovery operations and reduce website down time when bugs or unexpected operation occurs when a current version is rendered.

SUMMARY OF THE INVENTION

Responsive to these issues, the present invention is directed in part to a method for proofing a prototype dynamic webpage version referencing first configuration data, the prototype dynamic webpage being associated with a live dynamic webpage version referencing second configuration data and accessible via a live link. This method includes storing the first configuration data in a configuration database, the configuration database containing the second configuration data, providing a prototype link to the prototype dynamic webpage version dissimilar from the live link; and returning, upon a request including the prototype link, the prototype dynamic webpage version, which involves rendering the prototype dynamic webpage version based on the first configuration data contained in the configuration database without altering the live dynamic webpage version.

Another aspect of the present invention is directed to a dynamic webpage versioning system incorporating a configuration database capable of storing plural versions of configuration data for a dynamic webpage and a publication engine in communication with said configuration database to manage said stored plural versions of the configuration data responsive to a version transition request.

Additional aspects and advantages of this invention will be apparent from the following detailed description of particular embodiments thereof, which proceeds with reference to the accompanying drawings.

BRIEF DESCRIPTION OF THE DRAWINGS

FIG. 6 depicts pseudocode of dynamic webpage request processing undertaken by elements of the website manager shown in FIG. 1.

FIG. 7 depicts pseudocode of WIP to PROOF stage transition processing undertaken by elements of the website manager shown in FIG. 1.

FIG. 8 depicts pseudocode of PROOF to LIVE stage transition processing undertaken by elements of the website manager shown in FIG. 1.

DETAILED DESCRIPTION

Figure 1:
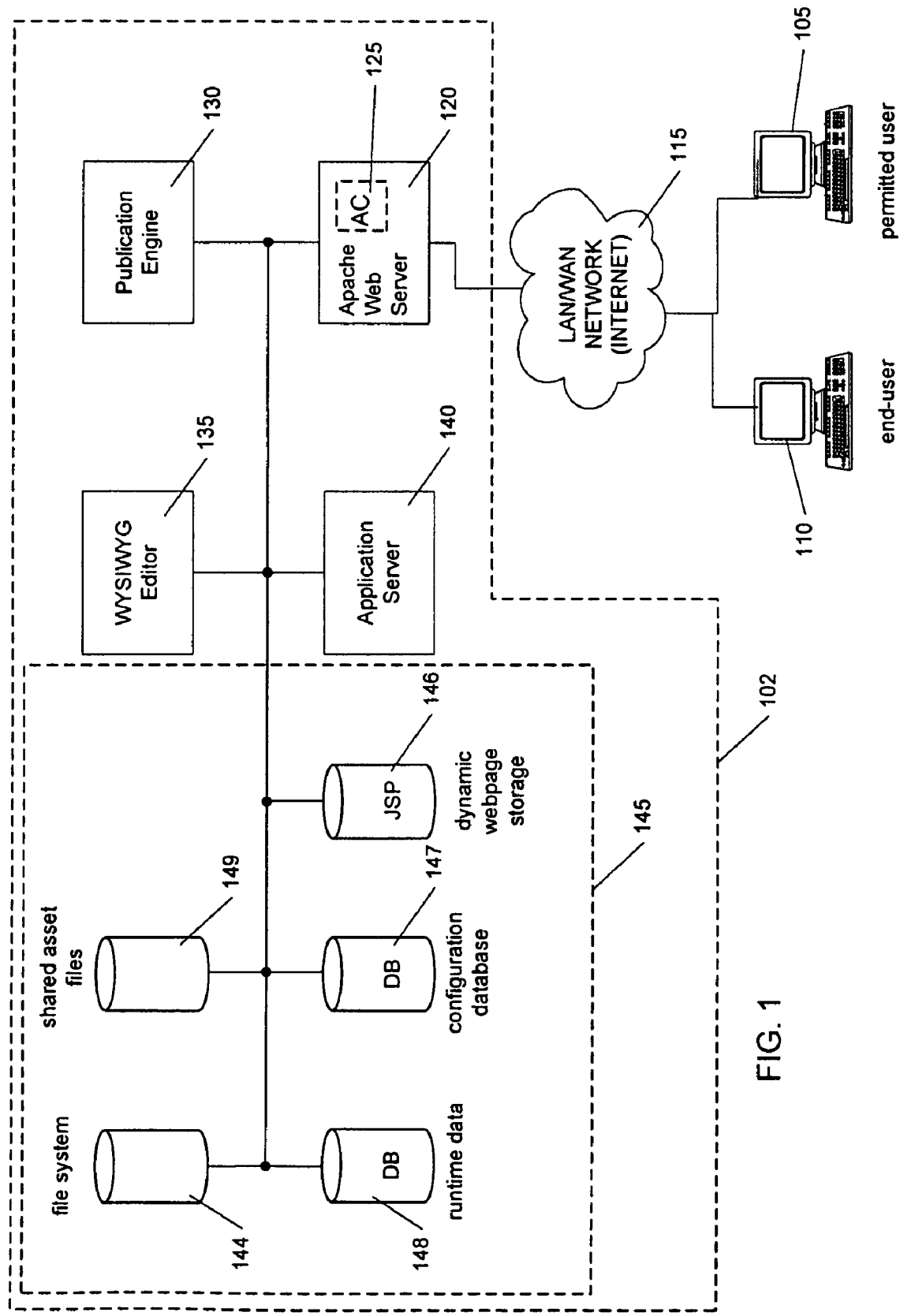
FIG. 1 is a schematic diagram of a system including a website manager according to an embodiment of the present invention.

FIG. 1 depicts a system including a website manager according to an embodiment of the present invention. Here the website manager 102 is shown in FIG. 1 to be in signal communication with the network 115, which may conveniently comprise a LAN or local area network, a wide area network or WAN, or a combination thereof as is known in the art. Typically, though not required, network 115 can be viewed as a component of, or encompassing the Internet. At the other end of the network 115, an end-user computer 110 is provided which includes a client browser for accessing web content. Likewise, permitted user 105 PC such as a website administrator is also likewise in signal communication with the website manager 102 via the network 115, and includes an instance of a client browser, such as Internet Explorer available from the Microsoft Corporation of Redmond, Wash., Netscape from Netscape Communications, Inc. of Mountain View, Calif., Safari from Apple Computer, Inc. of Cupertino, Calif., or other web browser capable of retrieving web-based information including static webpages or at least target webpages rendered from dynamic webpages.

Still referring to FIG. 1, the website manager includes an Apache web server 120 which handles routine inbound http:// . . . requests and performs other standard web server functions as is known in the art. Though in this embodiment, the web server 120 comprises an Apache web server, other web servers known in the art may be interchangeably used without departing from the teachings of the invention. Such web servers could alternatively include for example: Internet Information Services from Microsoft Corporation of Redmond, Wash.; Zeus Web Server from Zeus of Cambridge, UK; Netscape Enterprise Server from Netscape Communications of Mountain View, Calif.; thttpd from ACME Laboratories of Berkley, Calif.; tigershark from directNIC of New Orleans, La.; WebSTAR from 4D, Inc. of San Jose, Calif.; Lotus Domino Server from International Business Machines of Armonk, N.Y.; or VisNetic WebSite from Deefield.com Software of Gaylord, Mich.; 120 includes an access control thread 125 that controls or restricts access to certain web pages maintained by the web site manager 102. Preferably, though not require, this access control thread looks at the originator of the http:// requests and passed CGI parameters as well as other request components in order to resolve and enforce webpage access control. As will be discussed in greater detail below, only limited access will be provided to PROOF and to previous-LIVE versions of dynamic web pages.

Also shown in FIG. 1 is an application server 140. This web logic application server may conveniently include a WebLogic™ J2EE compliant Application Server product, version 6.1 or higher, from BEA Systems of San Jose, Calif. However, use of such product is not required, and in fact any web logic application server capable of executing and rendering dynamic webpages such as java server pages or active server pages may be interchangeably utilized. As illustrated via pseudocode in FIG. 6, the Apache web server 120, forwards http:// request for dynamic server pages to the application server 140. The application server 140, based on the contents of the request, finds the dynamic template from the dynamic template storage area 146 corresponding to the request, any relevant configuration data in the configuration database 147, any required runtime data contained in e.g. the run time database 148 or from end-user or user input, and any shared assets contained in the shared asset file system 144 required to render the desired target website. As will be described in more detail below, in the case of published dynamic webpages, the web logic application server can also include static HTML files into the dynamic page to be rendered, which are stored in this embodiment within the hierarchical file system 144. The application server 140 also carries out any functional instructions embedded coded in the dynamic webpage, as is well-known in the art.

A data storage system 145 is also provided as part of the website manager 102. As discussed previously, this data storage system includes a number of logical file systems and databases in which one or more components of the dynamic pages are retained. It should be noted that the structure of data storage system according to this embodiment is only exemplary and is very schematic in nature. And in fact the wide variety of physical storage system alternatives may be interchangeably used in order to provide the necessary storage features. For example, the data storage system 145 may be provided on a distributed server farm, or any other combination of data storage units, including, as appropriate, a single storage system. One logical unit, the dynamic webpage storage area 146, stores the dynamic webpage templates upon which a number of target webpages managed by the website manager are based. It should be appreciated that a relatively small number of dynamic webpage templates which include feature-rich custom and predefined tags and/or sophisticated coding can define quite a variety of HTML, XML, VML, or other static forms of webpages.

Figure 3:
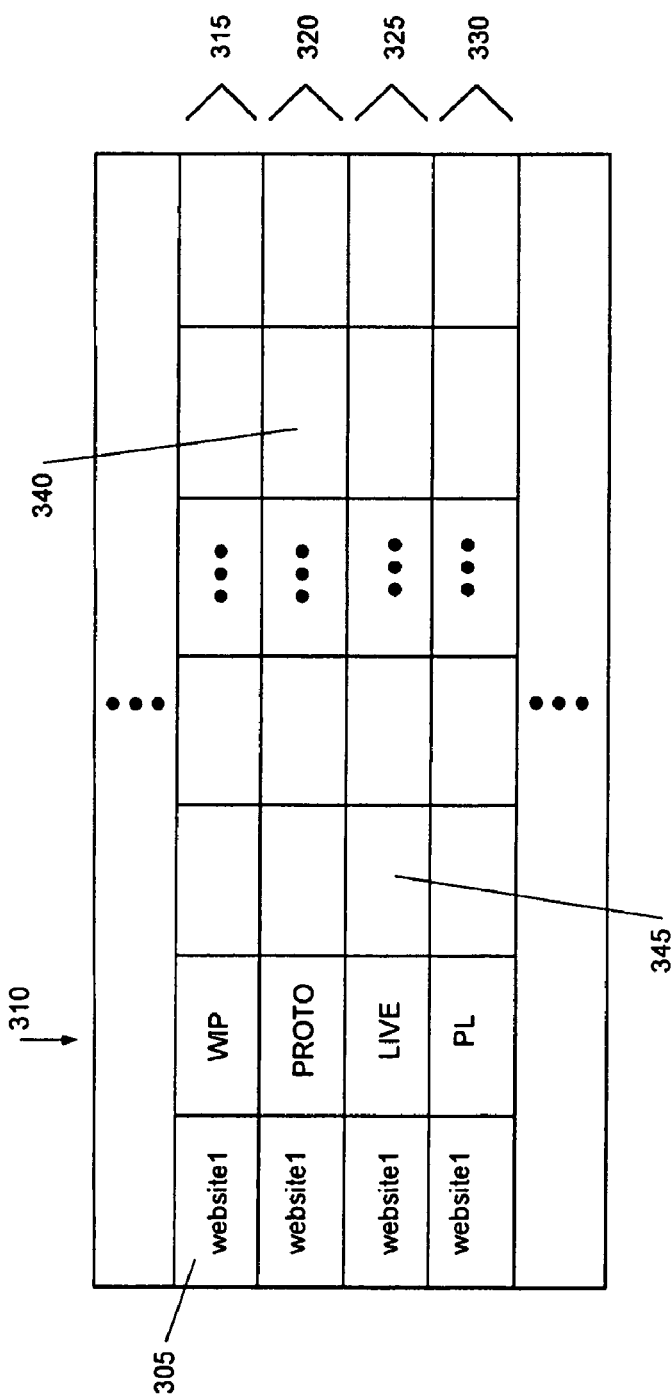
FIG. 3 is a diagram of an example organization of the configuration database shown in FIG. 1.

The data storage system 145 also includes the configuration database 147. This configuration database handles the configuration data parameters that need to be passed to the dynamic webpage template stored in the dynamic webpage template file system 146 in order to render, at least in part, the desired target webpage. In the embodiment as detailed in FIG. 3, the configuration data for a dynamic webpage template is stored as a record in a flat relational database 147 as shown in FIG. 3. Here, each column 315, 320, 325 and 330 define a different record. As will be discussed in more detail below, one target webpage may have up to four versions of the configuration data to reflect different versions of the dynamic webpage managed by and accessible to the website manager 102. So, in this case, four rows 315, 320, 325, and 330 each define the different versions or flavors of a target webpage ("website 1" in FIG. 3) which utilize a common dynamic webpage template and potentially varying configuration data.

Noting in this embodiment that each version shares a common template, such limitation is not in fact required, and that different dynamic webpage templates may be referred to and utilized as well. Moreover, to simplify database construction, management, and data lookup, each column of the configuration database 147 represents the same type of configuration data. However, such architecture is not required to practice the invention and in fact variably sized and dissimilar records of configuration data may be utilized, as long as the data can be recalled by version from the database.

The website manager 102 of the embodiment shown in FIG. 1 is capable of providing four distinct versions of each dynamic website it manages. The versions include a restricted access work in progress ("WIP") version, a restricted access prototype ("PROTO") version for proofing or trial run purposes, an unrestricted access ("LIVE") version suitable for operation, and a backup or previous live ("PREVIOUS_LIVE") version of the immediately preceding live version. The WIP version is unpublished, meaning it remains fully dynamic (no pre-rendered static HTML equivalents for the static components). This unpublished configuration permits the widest degree of editing flexibility, since all static and dynamic components are built on-the-fly consistent with conventional dynamic webpage management. The remaining three versions are considered to be published since, in these cases, pre-rendered static html equivalents replace the dynamically coded static components of the dynamic webpage. The differences between published and unpublished webpages will be explored in more detail below with reference to FIG. 2. Transitioning between versions will be discussed in greater detail below with reference to FIG. 4.

Referring now back to FIG. 1, the storage system 145 also includes a runtime database 148. This runtime database includes runtime data collected from sources typically external to the website manager 102. As previously mentioned, runtime data differs from configuration data in that its content is important in and of itself and may change real time independently of webpage navigation, whereas configuration data contained in the configuration database is used to guide how the dynamically produced target page of interest will look and feel to the user. The configuration data basically instructs how to render the dynamic webpage, and such data is not necessarily important to the end-user or permitted user requesting the target webpage (assuming, of course, that it's correctly rendered). Using the automotive website example, runtime data may include used or new car inventory information pulled from a dealer or auto group database, or time sensitive advertising and promotion data.

The shared asset file system 149, another logical structure within the storage system 145, contains information that is shared across different webpages managed by and possibly websites hosted by the website manager 102. Such information can conveniently include graphics information shared across members of a common business entity such as an auto group, as in the case of commonly owned auto dealerships. Other shared assets could include sample pictures of new or used vehicles and new vehicle information, as well as trademarks and logos used by the OEM or manufacturers of automotive products and/or automobiles. Of course, such examples are not intended to be limiting in any way.

Figure 5:
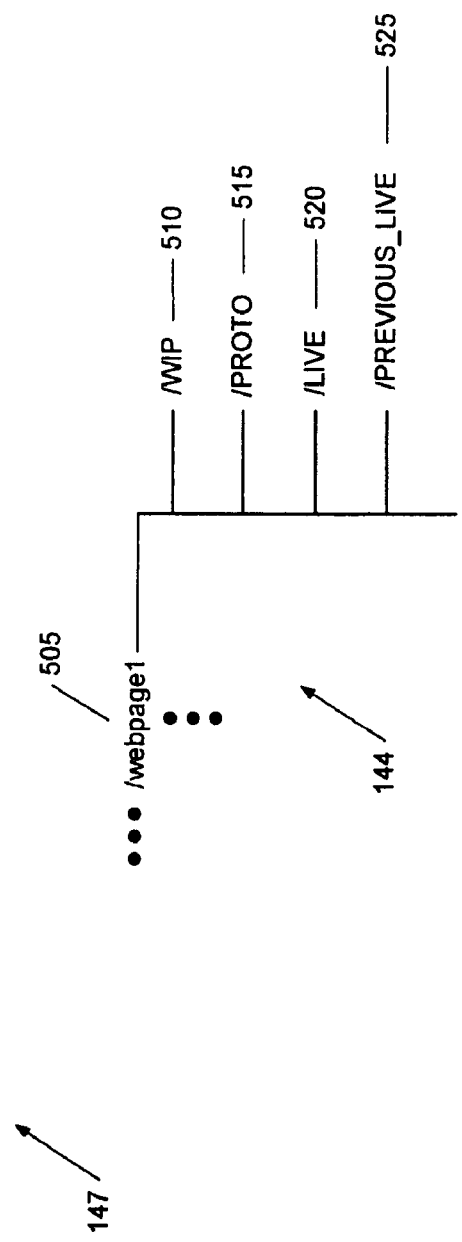
FIG. 5 diagrammatically illustrates an example of hierarchical storage in accordance with an embodiment of the invention.

Still referring to FIG. 1, also provided within the storage system 145 is a file system 144 which is used to retain on a hierarchical basis, previously rendered static HTML equivalents of the static components of published versions of dynamic webpages. These equivalents, stored here as files, are used to speed up rendition of the dynamic template in a manner consistent with the present invention. An example structure is shown in FIG. 5. As shown in FIG. 5, each dynamic webpage maintained by the website manager 102 preferably has a number of subdirectories underneath it, one for each version. In this embodiment, for example purposes only, four versions are provided including a work in progress or . . . /WIP subdirectory 510, a prototype or . . . /PROTO subdirectory 515, a live or . . . /LIVE subdirectory 520, and a previous-live or backup . . . /PREVIOUS_LIVE subdirectory 525. These are all specified for the webpage 505.

Figure 4:
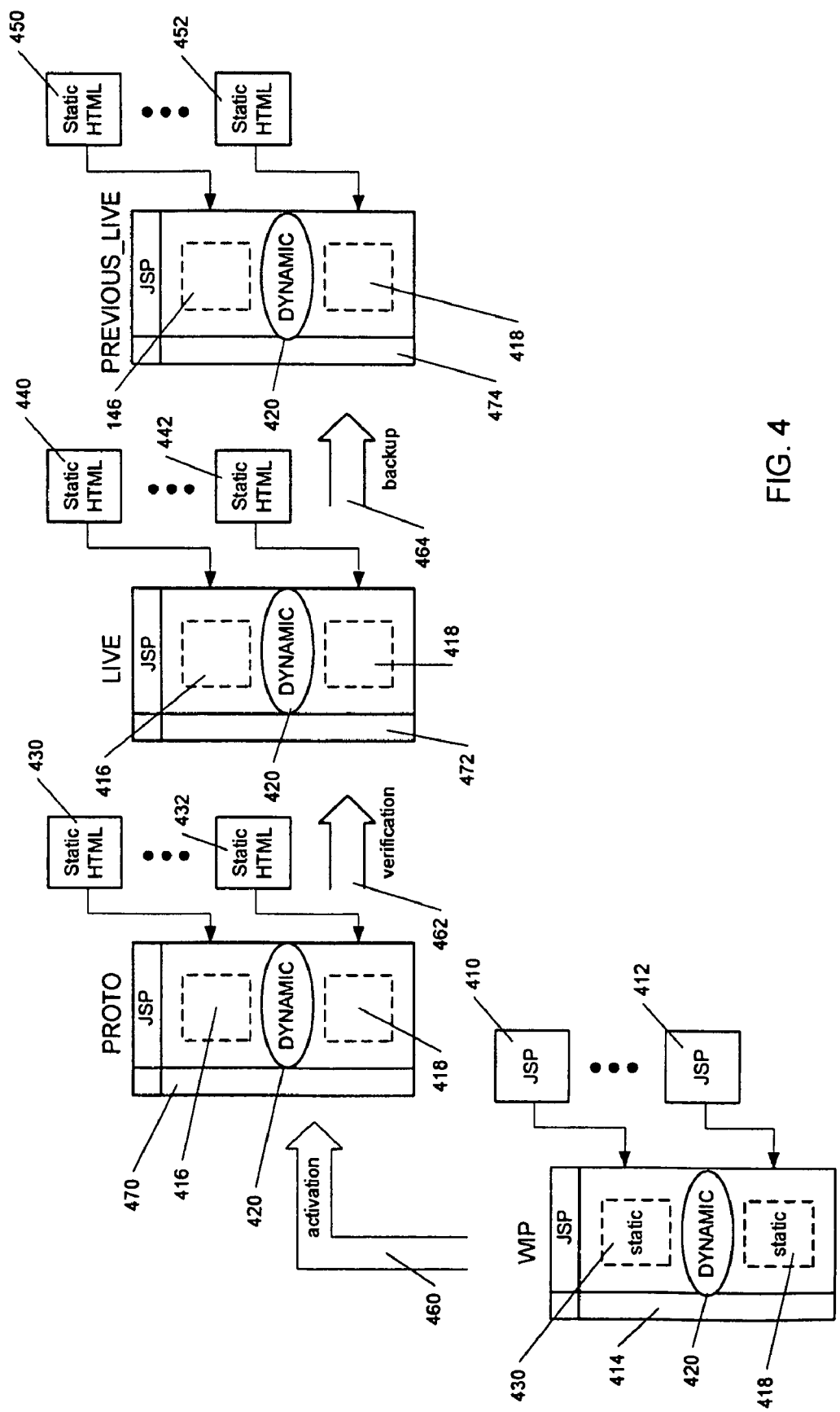
FIG. 4 diagrammatically illustrates publication stages of a dynamic webpage in accordance with an embodiment of the invention.

The static HTML equivalents are rendered as the dynamic webpage transitions from unpublished to PROOF, also known as an activation transition 460 shown in FIG. 4 for a JSP implementation. In particular, the publication engine 130 causes the static components of the JSP dynamic webpage to be rendered with relation to WIP configuration data contained in the configuration database 147. For example, if the activation transition 460 is considered with reference to FIG. 4, the JSP defined static components 410 and 412 are rendered by the publication engine 130 as static HTML files 430 and 432 (note that although two HTML files are shown as well as two JSP files, more or less static components may be provided in any given dynamic page). These static pages 430 and 432 would be stored under the prototype subdirectory 515 shown in FIG. 5. Moreover, the JSP files 410 and 412 dynamically defining the static components of the dynamic webpage 414 may be stored in this embodiment within the work in progress subdirectory 510. Alternatively, though not shown in FIG. 4, these JSP static component versions may be stored in-line with the rest of the dynamic webpage 414 in slots 416 and 418 respectively.

Other subdirectories defined by the file system 144 will be used as the webpage transitions to other types of versions including the LIVE and previous-LIVE versions discussed in more detail below with reference to FIG. 4.

Referring again to FIG. 1, also provided within the website manager 102 of the present embodiment is a WYSIWYG editor 130. This is a server based WYSIWYG editor, the details of which may be provided with reference to U.S. patent application Ser. No. 10/351,465, filed on even date herewith and entitled REMOTE WEB SITE EDITING IN A STANDARD WEB BROWSER WITHOUT EXTERNAL SOFTWARE, now U.S. Pat. No. 7,000,184, the contents of which are incorporated herein by reference. Other server based WYSIWYG editors including those provided by Ektron Corporation of Nashua, N.H. may be used interchangeably, as long as they can be adapted to support versioning consistent with the present invention. The server based WYSIWYG editor 135 provides the ability to edit configuration data in the configuration database 147 for dynamic webpage templates stored on the template file system 146 in order to provide a tailored look and feel and interfacing. In an alternative embodiment, a conventional client-based WYSIWYG or other type of dynamic webpage editor may be utilized from e.g. the permitted user-client PC 105 as shown in FIG. 1.

Finally, the website manager 102 includes a publication engine 130. This publication engine helps dynamic webpages managed by the website manager 102 transition between versions. In particular, this publication engine 130 renders the static HTML equivalents as discussed above (see FIG. 7) at the activation transition 460. Include links to the static component equivalents may be conveniently created on the fly through passing the version information (column 310, FIG. 3) as part of the configuration during rendition of the dynamic webpage to "link" code presented in the template, such as a custom JSP tag having awareness of the hierarchical file system 144. Of course, other techniques for managing file links may be used as is known in the art. This is done so that when the prototype version of the dynamic webpage is requested via a web-browser, the correct . . . /PROTO static HTML files can be found within the file system 144 and included as part of the rendered target webpage. The publication engine 130 also carries out the tasks noted in the pseudocode presented in FIG. 8, including transitioning the prototype or . . . /PROTO dynamic webpage version into the commercially accessible LIVE version (transition verification 462 in FIG. 4).

Finally, the publication engine tracks and manages versioning of the configuration database 147. For example, as detailed with reference to pseudocode depicted in FIG. 7, during the WIP to PROTO version transition (aka activation 460), the publication engine copies configuration data stored for the WIP version (e.g. row 315 in FIG. 3) and places it in the PROTO version (row 320). Also, during the transition from PROOF to LIVE versions, as detailed with reference to FIG. 8, the publication engine 130 causes configuration data for the current LIVE version (row 325) to be preserved in the PREVIOUS_LIVE version (row 330), and then push PROOF configuration data (row 320) into row 325.

Figure 2:
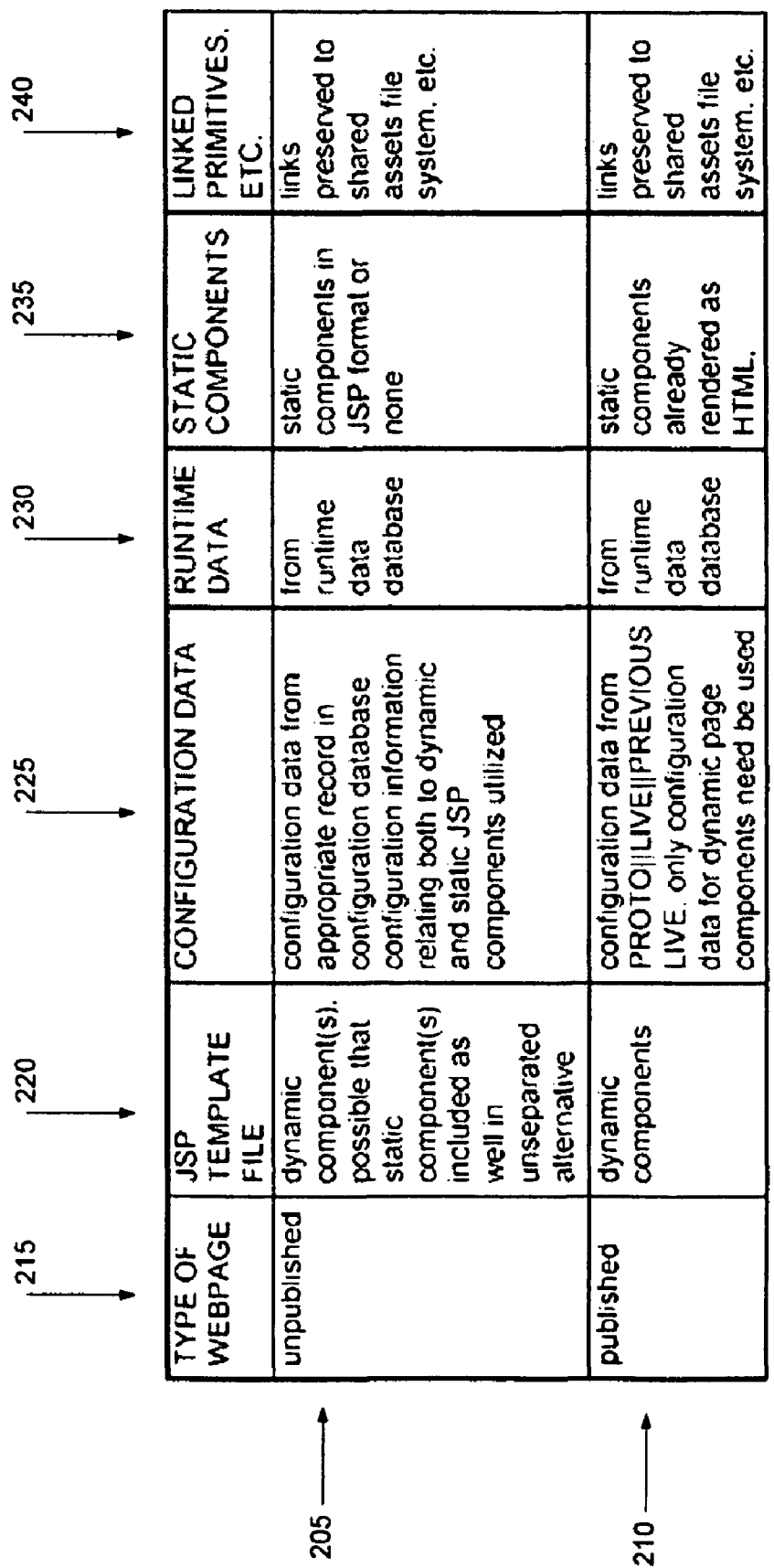
FIG. 2 describes the differences between unpublished and published dynamic webpages in accordance with an embodiment of the invention.

Turning now to FIG. 2, FIG. 2 discusses the differences in the configuration of unpublished and published dynamic webpages in accordance with the current embodiment. Here, the unpublished webpage elements are presented in row 205, whereas the published dynamic webpage elements are presented in row 210. The logical sum of all five elements in the row allows an application server such as server 140 render the dynamic page.

Referring first to column 220, it should be appreciated that both the unpublished and published versions of the dynamic webpage utilize a common dynamic webpage template herein stored in the template database 146 (possibly, in one implementation as a JSP text file). For the unpublished version, include information within the main template point to JSP encoded static component files as provided by version and webpage id configuration information in the present embodiment. As mentioned above, these JSP files may be stored with the template file in the template database 146, or could be stored within the WIP version subdirectory (e.g. subdirectory 510 in FIG. 5). However, the particular placement of the JSP files defining the static components dynamically is not important as long as it can be made accessible to the web logic server 140 when the dynamic page needs to be rendered. For the published versions (PROTO, LIVE, PREVIOUS_LIVE), links to the appropriate subdirectories (e.g. . . . /PROTO subdirectory 515, . . . /LIVE subdirectory 520, . . . /PREVI-OUS_LIVE subdirectory 525) are created within the template through the aforementioned webpage id and version configuration data.

Note here that in an alternative embodiment not shown in the figures, the static components in the unpublished version of the webpage may be presented in line as part of the template file and not as include dynamic webpage files such as a dynamic JSP file 410 or 412 shown in FIG. 4. In yet a further alternative embodiment, the static html equivalents of these JSP files (e.g. files 430, 432 for PROTO version, files 440, 442 for LIVE version, and files 450, 452 for PREVIOUS LIVE version) could be included in-line with the dynamic components in the JSP template file, with different versions of the template file tracked and managed.

Referring now to row 210, in the published case, looking at column 220, only the dynamic components utilized from the JSP template are used. The static components are defined by the HTML equivalents stored in the file system 144.

Column 225 illustrates the difference in configuration data between an unpublished and published webpage in accordance with the present embodiment. Referring now to column 225, the configuration data in the unpublished case takes the configuration data from the appropriate record (one of WIP, PROTO, LIVE, or PREVIOUS_LIVE records for the webpage depending on which webpage version the present WIP version originates from, loaded at the beginning of an edit session, in the configuration database 147 specified for the webpage of interest. It should be noted that after initial edit and save as work in progress, further configuration database information will thereafter be plucked from the WIP record contained in the configuration database until an activation transition is invoked. Once the initial configuration information or data has been retrieved from the version undergoing edit, a copy of that configuration information is stored and updated in the WIP record for the webpage. It should be noted that all of the configuration data contained in the record will be utilized for the unpublished version, as the entire dynamic webpage, both static and dynamic components thereof, will be rendered dynamically by the web logic application server. Compare this to the entry in row 210, where only the configuration data for the dynamic page components need be referred to and utilized. This is because the static components have already been pre-rendered in HTML form equivalents, thus eliminating the need for consultation with the static component configuration data contained in the configuration database 147. Next, either case, appropriate runtime data is plucked from the runtime database 148 shown in FIG. 1.

Turning to the static components column 235, for the unpublished version, if there are additional static component files, such static component files will be in the dynamic format, as discussed above. In the case of published versions, the static components will have been rendered by the publication engine 130 and stored in the appropriate version subdirectory of the file system 144. Column 240 discusses treatment of links, primitives, embedded objects, images and other types of shared assets. In either case of unpublished or published dynamic webpage, links are preserved to the shared file asset system 149 or to other places either locally or remotely accessible to the website manager 102 as is known in the art.

The four dynamic webpage versions will now be discussed in greater detail with reference to FIG. 4. In particular, FIG. 4 illustrates a transition diagram for a particular dynamic webpage in accordance with an embodiment of the invention. In particular, four successive versions are shown including WIP, PROTO, LIVE and PREVIOUS-LIVE. The WIP or work-in-progress version places the dynamic webpage in an unpublished, fully dynamic configuration suitable for editing. In other words, in the initial WIP or work in progress state, the dynamic webpage is fully dynamic (i.e. fully defined in terms of JSP or ASP files+configuration data). In such case both the static 410, 412 and dynamic components 420 are presented in dynamic form, and configuration data contained in the configuration database is necessary to define a particular instance of the webpage.

In this embodiment, the static components have been already segregated out from the main template body of the dynamic webpage 414. These include JSP files 410 and 412 and these may conveniently be stored in the . . . /WIP subdirectory for the webpage, or may be retained with the template containing the dynamic components within the template storage area 146. Separation of the static components in such manner increases modularity and portability as well as enable quicker eventual rendering of the static components once the WIP version has been activated for proofing (transition 460). This also enables the publication engine 130 to easily distinguish from a template designer's perspective which components are static versus dynamic, by simply referring to the include statement in the main dynamic webpage template file 414. However, in another embodiment, the static components 410 and 412 may be contained in-line in e.g. spaces 416 and 418 of the main template 414, though doing so may complicate versioning from a template perspective. Even in such case, e.g. JSP tagging or other dynamic coding may be used to indicate that certain components are static whereas certain other components such as dynamic component 420 are in fact dynamic and cannot be rendered in static HTML, XML, VML, or other markup language suitable for direct loading by a web browser.

When the user requests a prototype version of a WIP dynamic webpage (transition 460), the publication engine 130 undertakes to pre-render the static components contained in the separate JSP files 410 or 412 or, alternatively, contained within place holders 416 and 418 of the main dynamic webpage. This is done to improve overall on-the-fly rendering performance since less dynamic webpage code and configuration data (only that defining the dynamic components of the webpage) need be rendered on-the-fly. In comparison, conventional dynamic webpage management techniques require the entire page to rendered on the fly by the web server. Once rendered in separate files, 430 and 432, they are stored under the PROTO subdirectory for the webpage of interest in the file system 144. The dynamic components 420 remain within the dynamic webpage template 470. In addition, as noted in FIG. 7, the publication and engine updates the links inside the dynamic webpage template 470 in order for it to point to the correct static HTML files 430, 432. In addition, the publication engine 130 apprises the user requesting the proof of the URL address in which to load and execute the PROTO version of the desired dynamic webpage.

Once the permitted user, after proofing the prototype webpage, desires to enable it for public or commercial use, customer facing entities, this user initiates a verification transition 462 with the publication engine 130. At this transition, the publication engine 130 performs several actions. First, it determines whether for backup purposes the previous LIVE version needs to retain static HTML files or in fact need only store configuration information. It should be realized that only configuration information need be stored in order to recreate the webpage at least dynamically for the previous version (assuming the dynamic template and JSP include files remain unchanged, or, at worst are backwards compatible with the PREVIOUS_LIVE version). However, keeping the static HTML files may impart the performance boost and also preserve a truer version of the previous LIVE website. Thus, in this case, the static HTML files are preserved in the PREVIOUS_LIVE subdirectory of the file system 144 or the webpage in question as files 450 and 452. Configuration data for the current LIVE version is stored in the PREVIOUS_LIVE record in the configuration database and orchestrated by the publication engine 130. These steps preserve the current LIVE version.

Next, referring to FIGS. 4 and 8, the PROTO versions of the static html equivalents 440, 442 and configuration data are pushed to the LIVE storage areas in the file system 144 and configuration database 147 respectively by the publication engine 130.

It will be obvious to those having skill in the art that many changes may be made to the details of the above-described embodiments without departing from the underlying principles of the invention. The scope of the present invention should, therefore, be determined only by the following claims.

The invention claimed is:

1. A dynamic webpage versioning system, comprising:
   a configuration database comprising computer-readable storage media, the configuration database configured to store plural versions of configuration data for a dynamic webpage, wherein each of the plural versions is simultaneously available without reconstruction by the configuration database for production of plural versions of the dynamic webpage, the plural versions comprising a first version and a second version; and
   a computing device comprising a processor and communicatively coupled to the configuration database and a network, the computing device comprising,
      a website manager operable on the processor and configured to produce two or more different versions of the dynamic webpage at the same time using different versions of the configuration data, wherein the website manager makes the dynamic webpage produced using the first version of the configuration data publically available at a first uniform resource locator (URL) to one or more users on the network, and restricts access to the dynamic webpage produced using the second version of the configuration data and accessible on the network at a second URL, and
      a publication engine operable on the processor and configured to replace the first version of the configuration data with the second version of the configuration data in the configuration database in response to a version transition request,
      wherein, in response to a request from a particular client to the first URL and prior to the version transition request, the website manager produces the dynamic webpage using the first version of the configuration data,
   wherein the plural versions of the configuration data stored on the computer-readable storage medium of the configuration database comprise a work-in-progress version, a prototype version, a live version, and a previous live version, and wherein the publication engine is to transition the work-in-progress version of the configuration data to the prototype version by causing the configuration database to store the work-in-progress version of the configuration data as prototype configuration data, and
   wherein to transition the work-in-progress version of the configuration data to the prototype version, the publication engine is further configured to pre-render one or more dynamically defined, static components of the dynamic webpage produced using the work-in-progress version of the configuration data and to cause the configuration database to store the pre-rendered components as prototype configuration data.

2. The system of claim 1, wherein the configuration data is stored on the computer-readable media of the configuration database in a hierarchical file system including a different subdirectory for each version of the configuration data, and wherein the publication engine causes the configuration database to store work-in-progress configuration data as prototype configuration data by causing the configuration database to copy configuration data from a work-in-progress subdirectory to a prototype subdirectory.

3. The system of claim 1, wherein the work-in-progress version is unpublished and the prototype, live, and previous live versions are published.

4. The system of claim 1, wherein the plural versions of the configuration data comprise a work-in-progress version, a prototype version, a live version, and a previous live version, and wherein the website manager is further configured to provide public access to a dynamic webpage produced using the live version of the configuration data and to restrict access to dynamic webpages produced using the work-in-progress, prototype, and previous live versions of the configuration data.

5. The system of claim 1, wherein to transition the work-in-progress configuration data to the prototype version, the publication engine is further configured to insert one or more links to the pre-rendered components into the prototype version of the dynamic webpage.

6. The system of claim 1, wherein the second version of the configuration data comprises a dynamic component having a static equivalent, and wherein, in response to the version transition request, the publication manager is configured to pre-render the dynamic component into the static equivalent and to store the pre-rendered, static equivalent with the first version of the configuration data in the configuration database.

7. A computer-readable storage medium, comprising computer-readable instructions to cause a computing device to implement a method, comprising:
providing a dynamic webpage versioning system configured to provide concurrent access to plural versions of a dynamic webpage, the plural versions comprising a first version and a second version, the system comprising distinct software modules embodied on the computer-readable storage medium, wherein the software modules comprise a configuration database, a publication engine, and a website manager;
the configuration database storing plural versions of configuration data for a dynamic webpage, wherein the configuration database is configured to allow simultaneous access to each of the plural versions of the configuration data without reconstruction by the configuration database;
the website manager providing simultaneous access to each of the plural versions of the dynamic webpage, wherein the website manager is configured to produce two or more different versions of the dynamic webpage at the same time using different versions of the configuration data, and wherein the website manager is configured to make the dynamic webpage produced using the first version of the configuration data publically available on a network at a first uniform resource locator (URL), and to restrict access to the dynamic webpage produced using the second version of the configuration data and accessible on the network at a second URL; and
the publication engine managing requests to transition between the plural versions of the configuration data, wherein a transition request comprises replacing the first version of the configuration data with the second version of the configuration data in the configuration database, wherein, in response to a request from a particular client to the first URL and prior to the transition request, the website manager produces the dynamic webpage using the first version of the configuration data,
wherein the plural versions of the configuration data comprise a work-in-progress version, a prototype version, a live version, and a previous live version, the method further comprising:
the publication engine receiving a request to transition work-in-progress configuration data to prototype configuration data; and
the publication engine transitioning the work-in-progress configuration data to prototype configuration data by causing the configuration database to store the work-in-progress configuration data as prototype configuration data in response to the transition request,
wherein the publication engine transitioning the work-in-progress configuration data to prototype configuration data further comprises the publication engine pre-rendering static HTML equivalents for dynamically defined, static components of the dynamic webpage produced using the work-in-progress configuration data; and
the publication engine causing the configuration database to store the pre-rendered static HTML equivalents as prototype configuration data.

8. The computer-readable storage medium of claim 7, wherein the plural versions of the configuration data comprise a work-in-progress version, a prototype version, a live version, and a previous live version.

9. The computer-readable storage medium of claim 7, the method further comprising:
the publication engine receiving a request to transition a first version of the configuration data to a second version of the configuration data; and
the publication engine causing the configuration database to store the first version of configuration data as the second version of the configuration data responsive to the request.

10. The computer-readable storage medium of claim 7, wherein the configuration database stores the configuration data in a hierarchical file system including a different subdirectory for each version of the configuration data, and wherein the publication engine transitioning the work-in-progress configuration data to prototype configuration data comprises causing the configuration database to copy configuration data from a work-in-progress subdirectory to a prototype subdirectory.

11. The computer-readable storage medium of claim 7, wherein the publication engine is to apprise a user of a URL for the dynamic webpage produced using the prototype version of the configuration data.

12. A method for dynamic webpage versioning, comprising:
providing a dynamic webpage versioning system, wherein the system comprises distinct software modules embodied on a computer-readable medium and operable on a processor, and wherein the distinct software modules comprise a configuration database, a website manager, and a publication engine;

the configuration database storing plural versions of configuration data, wherein each of the plural versions of the configuration data produce a different version of a dynamic webpage;

the configuration database making the plural versions of the configuration data simultaneously available to allow for production of plural versions of the dynamic webpage without reconstruction by the configuration database;

the website manager configured to produce two or more different versions of the dynamic webpage at the same time using different versions of the configuration data;

the publication engine receiving a request to transition a first version of the configuration data to a second version of the configuration data; and the publication engine transitioning the first version of the configuration data to the second version of the configuration data by causing the configuration database to store the first version of the configuration data as the second version of the configuration data in the configuration database responsive to the transition request;

wherein the plural versions of the configuration data comprise a work-in-progress version, a prototype version, a live version, and a previous live version, the method further comprising:

transitioning the work-in-progress version to the prototype version of the configuration data by causing the configuration database to store the work-in-progress version of the configuration data as prototype configuration data, and pre-rendering one or more dynamically defined, static components of a dynamic webpage produced using the work-in-progress version of the configuration data and to cause the configuration database to store the pre-rendered components as prototype configuration data.

13. The method of claim 12, wherein the first version in the transition request is the work-in-progress version of the configuration data, and the second version of the transition request is the prototype version, and wherein the publication engine transitioning the first version of the configuration data to the second version comprises the publication engine causing the configuration database to store the work-in-progress version of the configuration data as prototype configuration data.

14. The method of claim 12, wherein the first version in the transition request is the prototype version of the configuration data, and the second version of the transition request is the live version, and wherein the publication engine transitioning the first version of the configuration data to the second version comprises the publication engine causing the configuration database to store the live configuration data as previous live configuration data, and the publication engine causing the configuration database to store the prototype version of the configuration data as live configuration data.

15. The method of claim 14, wherein the configuration database stores the plural versions of the configuration data in a hierarchical file system including a different subdirectory for each of the plural versions of the configuration data, and wherein the publication engine transitioning the first version of the configuration data to the second version comprises the publication engine causing the configuration database to copy configuration data from a live subdirectory to a previous live subdirectory.

16. The method of claim 12, wherein the first version in the transition request is the prototype version of the configuration data, and the second version of the transition request is the live version, and wherein the publication engine transitioning the first version of configuration data to the second version comprises the publication engine causing the configuration database to store the prototype version of the configuration data as live configuration data.

17. The method of claim 16, wherein the configuration database stores the plural versions of the configuration data in a hierarchical file system including a different subdirectory for each version of the configuration data, and wherein the publication engine transitioning from the first version of the configuration data to the second version comprises the publication engine causing the configuration database to copy configuration data from a prototype subdirectory to a live subdirectory.

18. The method of claim 16, wherein the prototype configuration data comprises prototype static HTML, and wherein the publication engine causing the configuration database to store the prototype version of the configuration data as live configuration data further comprises the publication engine causing the configuration database to store the prototype static HTML as live configuration data.

\* \* \* \* \*